United States Patent Office 3,792,158
Patented Feb. 12, 1974

3,792,158
METAL HALIDE-ESTER REACTION PROCESS AND COMPOSITIONS
Marvin Michael Fein and John James Roderick, Paramus, N.J., assignors to Dart Industries, Inc., Los Angeles, Calif.
No Drawing. Original application May 28, 1971, Ser. No. 148,122, now Patent No. 3,721,693, dated Nov. 3, 1972. Divided and this application Oct. 2, 1972, Ser. No. 294,045
Int. Cl. A61k 7/00
U.S. Cl. 424—65          5 Claims

ABSTRACT OF THE DISCLOSURE

New compositions useful as antiperspirants are derived from the reaction of a metal halide Lewis acid with at least one ester selected from pyrocarbonates, carbonates and ortho formates, with or without subsequent further reaction with an organic hydroxyl-containing compound.

---

This is a division of application Ser. No. 148,122, filed May 28, 1971, now Pat. No. 3,721,693.

This invention relates to new compositions useful as antiperspirants and as flocculating agents.

Briefly, the invention relates to compositions produced by reaction of a Lewis acid and an ester coreactant with or without subsequent reaction with an organic hydroxyl-containing compound, all of which are further described hereinafter.

The Lewis acid, for purposes of this invention, is defined as any metal halide electron accepting material relative to the ester co-reactant. Included within this group are the metal halides (chlorides, bromides, iodides and fluorides) of metals and metalloids of the Groups I-B and II through VIII of the Periodic Table. Particularly preferred Lewis acids are the chlorides or bromides of a metal selected from the class consisting of Fe(III), Ti(IV), Zn(II), Sn(IV), Al(III), Mo(V), Zr(IV), W(VI), Hf(IV), Nb(V), Ta(V) and B(III). Mixtures of such Lewis acids may also be used.

The ester co-reactants used to produce the compositions of the invention generally include pyrocarbonate esters, carbonate esters and ortho esters. Pyrocarbonate esters are preferred and include those defined by the general formula

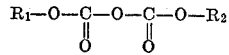

wherein $R_1$ and $R_2$, independently, are lower alkyl having 1–6 carbon atoms; aryl, generally phenyl and substituted phenyl wherein the substituents include chlorine and lower alkyl radicals; cycloalkyl, generally cyclohexyl and cyclopentyl; and aralkyl radicals, such as benzyl and phenylethyl wherein the phenyl moiety of the aralkyl substituent may also contain chlorine and lower alkyl substituents. Such pyrocarbonate esters are known in the art and may be prepared by reacting aqueous alkali or alkaline earth metal hydroxide solutions with solutions of chloro-carbonic esters dissolved in water immiscible solvents in the presence of tertiary amines. Preparations of this type are described in U.S. Pats. 3,078,294 and 3,240,796.

While the pyrocarbonate esters may be preferred there may also be used carbonate esters defined by the general formula

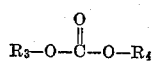

wherein $R_3$ and $R_4$ are the same as $R_1$ and $R_2$ described above with respect to the pyrocarbonate esters. These esters and their preparations are also known in the art.

In addition to the above mentioned esters there may also be employed ortho esters (formates) of the following general formula

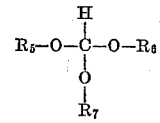

wherein $R_5$, $R_6$ and $R_7$ are the same as $R_1$ and $R_2$ defined above. These esters and their preparations are also known in the art. Of the ortho esters, the commercially available methyl, ethyl and isodecyl orthoformates are preferred.

The compositions according to this invention are prepared by reacting at least one metal halide Lewis acid with at least one of the ester co-reactants with or without further reaction with an organic hydroxyl-containing compound. The reaction between the metal halide and the ester may be conducted in any molar ratio with a hydrocarbon halide being split off and generally evolved as a gas. However, in a preferred form of the invention wherein the intended use of the composition is as an antiperspirant, it is desirable to react a stoichiometric equivalent or excess of the ester in proportion to the metal halide in order to replace as much of the halide as possible. Halides are irritants to the skin and therefore by using at least a stoichiometric amount of the ester it is thereby assured that, theoretically, sufficient ester is present to completely react with the metal halide and yield a less irritating composition.

The reaction is conducted in an inert medium, that is, a diluent which can include any aprotic diluent for the Lewis acid. Preferred members of such class are lower alkyl chlorides such as carbontetrachloride, methylene chloride and chloroform. These diluents for the Lewis acids are also generally found to function as solvents for the product. When a pyrocarbonate or orthoformate is used, it is generally required to use anhydrous conditions in view of the irreversible hydrolysis which occurs in the presence of water.

The reaction ingredients can be mixed in any sequence. However the preferred technique is to disperse the metal halide in the diluent and then slowly add the ester. The reverse form of addition, that is, the addition of the ester to the diluent, and subsequent addition of the metal halides is possible but generally results in a slower reaction (presumably due to the fact that the metal halide, as it drops into the reaction flask, is initially coated and therefore the reaction rate is reduced).

The reaction proceeds spontaneously and is exothermic in nature. If necessary, cooling should be applied to avoid such high temperatures as would result in decomposition. Generally, the temperature during reaction should be maintained in a range from 0–200° C. with the preferred temperature range being 20–60° C. The reaction mixture should be stirred due to the formation of a heavy precipitate during reaction. During reaction the precipitate which initially forms is gradually redissolved and the ultimate reaction mixture is gradually redissolved and the ultimate reaction mixture is rather viscous and syrupy. Also during reaction, gaseous hydrocarbon halide is generally evolved at a very rapid rate even at room temperature. Therefore it is advisable to slowly add the ester to the reaction medium. The reaction is completed when the exothermic heat ceases and generally corresponds to cessation of the evolution of hydrocarbon halide or after the elapse of a short period of time following completion of the addition of the reactants. It is desirable to heat and stir the reaction mixture for a period of time after evolution of the gas in order to insure substantial removal of any entrapped gases.

At the end of the reaction a dry, free-flowing powder may be produced by removal of volatile material such as the diluent and excess reactants according to conventional techniques. For example, recovery may be by distillation at a temperature below the decomposition point of the resulting metal-containing reaction product or vacuum stripping at lower temperatures until the composition results in the form of a powder. This composition can also be recovered by crystallization from the diluent by cooling at e.g. $-5°$ C. for several hours and filtering or by such crystallization after first removing the major portion of diluent by evaporation.

While the recovery of these compositions is within the skill of the art, it should be pointed out that in the case of aryl esters as reactants an aryl halide will result which will not be extremely volatile and in some cases will also be soluble in the reaction medium. These situations will require more effort in recovery of the product but still involve no more than conventional techniques.

The compositions prepared as described above are useful as antiperspirants and may be formulated into such commercial items according to known techniques and formulations depending upon the form of the commercial item, e.g. roll-on lotions, aerosol sprays, etc. These compositions are also suitable for use as flocculating agents for various colloidal dispersions, such as waste streams from paper mills containing colloidal dispersions of fibrous matter or in sludges containing iron hydroxides.

This invention not only includes the above compositions but also includes the reaction products resulting from further reacting the above compositions with a non-hindered organic hydroxyl-containing material such as $C_1$ to $C_{12}$ alkanol or $C_4$-$C_8$ cycloalkanol or phenol, preferably with a $C_1$-$C_7$ alkanol, more preferably with a $C_1$-$C_4$ alkanol. This reaction will generally require addition of some heat for a period of time to insure completion of the reaction. A very convenient manner in which to arrive at these further reaction products is to apply a conventional recrystallization technique using an alkanol to the composition produced by reacting the metal halide with the ester. The recrystallization product will be the reaction product which also functions as an antiperspirant and flocculent.

While the precise structures of the compositions of this invention have not been identified with any certainty they have been ascertained, as will be apparent from the examples hereinafter, to include both of the above mentioned groups of derivatives, namely (1) the solid reaction product of the metal halide and ester as hereinbefore defined and (2) the further reaction product of (1) with a non-hindered organic hydroxyl-containing material. Both groups of derivatives are particularly useful as antiperspirants for dispensing in the form of a spray (dispersed in fluorocarbons such as Freons), a rub-on stick (dispersed in waxes), a roll-on (suspended in a cream), etc.

The invention is further illustrated by reference to the following examples showing preferred forms thereof.

EXAMPLE I

Part A

A 2,000 milliliter, 3-necked flask was fitted with a water-cooled reflux condenser which in turn was connected to a trap; a thermometer and dropping funnel were also fitted to the reaction flask as well as a mechanical stirrer.

To the flask was charged 300 cc. chloroform and 67 grams $Al_2Cl_6$ (0.5 mole) and the mixture was stirred. To the dropping funnel was charged 243 grams (1.5 moles) diethylpyrocarbonates. The diethylpyrocarbonate was added at about room temperature (24–46° C.) dropwise over a period of about 1 hour. The temperature rose to about 46° C. during the first hour and then began to fall, whereupon the reaction medium was heated to about 40° C. Gaseous evolution began with the addition of diethyl- pyrocarbonate. During reaction, a white solid appeared and the mixture foamed due to the gas evolved. The mixture was stirred continuously during reaction in order to break up the white solid precipitate which gradually redissolved. The reaction mixture after about 2 hours was a brown viscous product. After evolution of gas had ceased during reaction, the mixture was heated to 60° C. and held for about 30 minutes to further degas the mixture. Chloroform and ethyl chloride were removed with moderate vacuum and the excess diethylpyrocarbonate was removed with 2–20 millimeters vacuum at 45–50° C. The reaction product was recovered as a powder of varying color, generally brownish, in a yield of about 78 grams.

Part B

The above procedure was repeated but the reaction product was recovered by crystallization. In this process the reaction mixture was chilled to about $-5°$ C. for one hour whereupon crystals formed and were filtered off and washed with $CCl_4$. The major portion of the diluent was removed by vacuum distillation at 45–50° C. and the remaining mixture cooled to $-5°$ C. with resulting crystals also recovered.

Part C

The reaction products from (A) and (B) were purified by slurring with 500 cc. Ligroine for ten minutes at 45–50° C., filtering, and washing with cold Ligroine. There was no color change but the melting point range increased by about 10° C. from about 63–70° C. to 73–78° C. The elemental analyses on the reaction products produced evidenced a content as follows: aluminum—13.08%, carbon—17.42%, hydrogen—5.28%, chlorine (ionic)—29.12%, chlorine (total)—29.23%, molecular weight of the product=126 or multiples thereof.

EXAMPLE II

The procedure of Example I was repeated using a mole ratio of 2 moles diethylpyrocarbonate per mole aluminum chloride. In this example 162 grams diethylpyrocarbonate (1.0 mole) was added over a period of 1 hour. The temperature again initially rose from room temperature to about 47° C. and then began to decrease, whereupon heat was added to return the reaction medium to 45° C.

At the end of the reaction the chloroform was distilled off and the product was recovered by vacuum distillation to dryness to yield 103 grams of an amorphous reaction product conforming to the elemental analysis in Example I.

EXAMPLE III

The procedure of Example II was repeated at mole ration 2:1 and the product was chilled for one and a half hours following cessation of gas production, the product was then filtered to yield approximately 81 grams concentrate and refrigerated overnight until crystals were again visible in the filtrate. The reaction product which was produced had a melting point of approximately 69° C. and conformed to the elemental analyses in Example I.

EXAMPLE IV

The procedure of Example I was followed using 201 grams aluminum chloride (1.5 moles), 575 cc. chloroform and 730 grams (4.5 moles) diethylpyrocarbonate. The ester was added dropwise over a period of 2 hours. About 270 grams of a solid reaction product melting at about 78–84° C. were recovered by crystallization procedures as outlined in Example I B. About 50 grams of the reaction product were dissolved in 500 cc. of ethyl alcohol (absolute) heated to 45–50° C. 5 grams of Darco S-51 was added and the mixture was held at 45–50° C. for 10 minutes while stirring. The slurry was then filtered through a filter aid (Hyflow AW) and the alcohol removed by vacuum stripping to dryness. The final reaction product recovered yielded 47.5 grams, and elemental analyses showed an aluminum content—13.35%, carbon content—5.99%, hydrogen content—5.26% and chlorine (ionic and total)—18.98%. IR curves run on this final reaction product differed radically from the IR curves obtained for the reaction product recovered in Example I by vacuum distillation or crystallization and not subject to contact with ethyl alcohol. This confirms the theory that a derivative is formed by reaction with the hydroxyl group in the organic hydroxyl group-containing compound (ethyl alcohol). The same type of derivative will be formed with other alkanols such as isopropanol, methanol, butanol, and hexanol.

The elemental analyses performed in this example and in Example I were conducted according to methods of the Schwarzkopf Microanalytical Lab.

EXAMPLE V

When the procedure of Example I or IV are reproduced using instead of 3 moles diethyl pyrocarbonate (per mole aluminum chloride), 3 moles of dibutyl pyrocarbonate, diphenyl pyrocarbonate, dicyclohexyl pyrocarbonate, dibenzyl pyrocarbonate, propyl-phenyl-pyrocarbonate, ethyl-cyclohexyl-pyrocarbonate or ethyl-phenyl ethyl-pyrocarbonate, corresponding reaction products similar to those obtained in Examples I and IV are obtained.

EXAMPLE VI

When the procedure of Examples I or IV are reproduced using instead of 3 moles diethyl pyrocarbonate (per mole aluminum chloride), 3 moles of dibutyl carbonate, diphenyl carbonate, dicyclohexyl carbonate, dibenzyl carbonate, propyl-phenyl-carbonate, ethyl-cyclohexyl carbonate, or ethyl-phenylethyl-carbonate, corresponding reaction products to those obtained in Examples I and IV are obtained.

EXAMPLE VII

When the procedures of Example I or IV are reproduced using instead of 3 moles diethyl pyrocarbonate (per mole aluminum chloride); 3 moles of (tri) methyl orthoformate; (tri) ethyl orthoformate; (tri) isodecyl orthoformate; (tri)phenyl orthoformate; (tri)cyclohexyl orthoformate; (tri)benzyl orthoformate; (di)propyl, phenyl orthoformate; ethyl (di)cyclohexyl orthoformate; or (di) ethyl, phenylethyl orthoformate, corresponding reaction products similar to those obtained in Examples I and IV are obtained.

EXAMPLE VIII

When Examples V, VI, and VII are reproduced using instead of 1 mole of $Al_2Cl_6$ 1 mole of $FeCl_3$, $SnCl_4$, $ZnCl_2$, $MoCl_5$, $ZrCl_4$, $WCl_6$, $HfCl_4$, $TaCl_5$, $NvCl_5$, $BCl_3$ or the bromide, iodide, or fluoride, similar reaction products are obtained corresponding to the respective metal of the metal halide employed.

Although the compositions of this invention in their use as antiperspirants can be applied in any composition having an aqueous and/or alcoholic base, it is preferred to use the final derivative obtained upon reaction with the hydroxyl-containing compound when an alcoholic base is utilized since the other derivatives will react with the alcohol and may present packaging problems. However, this is not essential since both derivatives function as antiperspirants.

In formulating antiperspirants it is possible to use roll-on lotions, pourable compositions, creams, impregnated pads, sticks, aerosol sprays, or powders. Suitable formulations are known to the art, however some typical formulations will be set forth below.

TABLE I

| | Parts by weight |
|---|---|
| Composition of this invention | 10–50 |
| Water | 5–30 |
| Anti-tack agent, for example, water soluble fluid silicone polymers such as Dow Corning Silicone (SFI–004) | 0–5 |
| Anhydrous ethanol | 0–60 |
| Film-forming resin for inhibiting transfer of the composition and reducing staining (for example, copolymer of lauryl methacrylate-N,N-diethyl ethylolaminoethylmethacrylate, quaternized disulfide) | 0–4 |
| Perfume and color | 0–1 |

When the antiperspirant is to be used in an aerosol bomb, a typical formulation is as follows:

TABLE II

| | Parts by weight |
|---|---|
| Composition of this invention | 4–15 |
| Anhydrous ethanol | 20–60 |
| (optional in the use of this invention) | |
| Emollient (for example, soluble esters alcohol and other components giving good skin touch such as oleyl alcohol, triethyl citrate, propylene glycol monolaurate, diethyl phthalate, lanolin stearol fraction) | 0–10 |
| Perfume solubilizer (for example, alcohol soluble surfactive agents such as ethoxylated nonyl phenol, etc.) | 0–2 |
| Anti-tack agents (for example, methyl phenyl polysiloxane Dow Corning 550) | 0–3 |
| Perfume | 0–1 |
| Liquified propellant (fluorinated or fluorochlorinated lower saturated aliphatic hydrocarbons-Freons) | 25–75 |

In the above composition, in the aerosol formulation, an "oil base" embodiment has been listed, however the nature of the carrier is not critical and the invention should not be considered limited to use of oil base composition. Alcohol base and dry powder base compositions known in the art can also be used.

A typical formulation for a liquid cream composition is as follows:

TABLE III

| | Parts by weight |
|---|---|
| Composition of this invention | 10–25 |
| Propylene glycol | 1–4 |
| Polyoxyethylene monostearate | ½–1 |
| Glyceryl monostearate | 1–4 |
| Methyl cellulose | 0–1.5 |
| Water | 65–80 |
| Perfume | 0.5 |

Multiple active ingredients can be utilized in the noted compositions.

The perfumes typically used in all of the noted compositions are, for example, sweet floral-aldehydic types as well as various floral odors and spice-type odors (for example, lavendar, lime or lemon odors).

Both the ester-Lewis acid reaction product and the alcoholic reaction product thereof have been tested on rabbits according to the 20-day subacute dermal toxicity study conducted by the methods of Carter Products Inc. After a dosage of 180 mg./kg. of the ester-Lewis acid reaction product applied separately each day over 15% of the body, which had been shaved, no deaths or abnormal patterns were noticed after 20 days and no irritation resulted. The same good results were achieved with 180 mg./kg. of the alcoholic reaction product thereof directly applied by this method.

Thus, having described the invention in detail it will be understood by those skilled in the art that certain variations and modifications may be made without departing from the spirit and scope of the invention as described herein or in the appended claims.

We claim:

1. An antiperspirant composition containing as an active ingredient a metal-containing product derived by reacting at least one metal halide Lewis acid with at least one ester of the group defined by the following formulas:

(I) $R_1-O-\underset{\underset{O}{\|}}{C}-O-\underset{\underset{O}{\|}}{C}-O-R_2,$ (II) $R_3-O-\underset{\underset{O}{\|}}{C}-O-R_4,$ or (III) $R_5-O-\underset{\underset{\underset{R_7}{|}}{\overset{|}{O}}}{\overset{H}{\underset{|}{C}}}-O-R_6$ wherein each of $R_1$, $R_2$, $R_3$, $R_4$, $R_5$, $R_6$, and $R_7$ are, independently selected from alkyl, aryl, cycloalkyl, or aralkyl radicals, and a carrier for said active ingredients.

2. The antiperspirant composition of claim 1 wherein the active ingredient is the further reaction product of the metal-containing product and an organic hydroxyl-containing compound selected from $C_1$–$C_{12}$ alkanol, $C_4$–$C_8$ cycloalkanol, or phenol.

3. An antiperspirant composition containing as an active ingredient a metal-containing product derived by reacting at least one metal halide Lewis acid selected from chlorides or bromides of Fe, Ti, Zn, Sn, Al, Mo, Zr, W, Hf, Nb, Ta or B with at least one ester of the group defined by the following formulas:

(I) $R_1-O-\underset{\underset{O}{\|}}{C}-O-\underset{\underset{O}{\|}}{C}-O-R_2,$ (II) $R_3-O-\underset{\underset{O}{\|}}{C}-O-R_4,$ or (III) $R_5-O-\underset{\underset{\underset{R_7}{|}}{\overset{|}{O}}}{\overset{H}{\underset{|}{C}}}-O-R_6$ wherein each of $R_1$, $R_2$, $R_3$, $R_4$, $R_5$, $R_6$, and $R_7$ are independently selected from alkyl, aryl, cycloalkyl, or aralkyl radicals, and a carrier for said active ingredients.

4. The antiperspirant composition of claim 3 wherein the active ingredient is the further reaction product of the metal containing product and an organic hydroxyl-containing compound selected from $C_1$–$C_{12}$ alkanol, $C_4$–$C_8$ cycloalkanol, or phenol.

5. The antiperspirant composition of claim 3 wherein the alkyl radical has 1 to 6 carbon atoms, the aryl radical is phenyl or phenyl substituted with chlorine or $C_1$–$C_6$ alkyl radicals, the cycloalkyl radical is cyclohexyl or cyclopentyl, and the aralkyl radical is benzyl or phenyl ethyl wherein the phenyl moieties are unsubstituted or substituted with chlorine or $C_1$–$C_6$ alkyl radicals.

References Cited

UNITED STATES PATENTS 3,721,693   3/1973   Fein et al.
3,350,463   10/1967   Hass et al. _____ 260—615 A

OTHER REFERENCES

Pike et al., Rec. Trav. Chim., 83 (1964).
Mason, J. Chem. Soc., 1963, pp. 558–9.

DANIEL E. WYMAN, Primary Examiner
A. P. DEMERS, Assistant Examiner

U.S. Cl. X.R.

106—308 Q; 260—429 R, 429.3, 429.5, 429.7, 429.9, 439 R, 448 R, 615 A; 424—66, 67, 68

UNITED STATES PATENT OFFICE
CERTIFICATE OF CORRECTION

Patent No. 3,792,158          Dated February 12, 1974

Inventor(s) Marvin Michael Fein and John James Roderick

It is certified that error appears in the above-identified patent and that said Letters Patent are hereby corrected as shown below:

Column 6, line 8, change "disulfide" to -- "disulfate"--

Signed and sealed this 16th day of July 1974.

(SEAL)
Attest:

McCOY M. GIBSON, JR.          C. MARSHALL DANN
Attesting Officer          Commissioner of Patents